Aug. 12, 1930.   J. TAYLOR   1,772,847
BATTERY SECURING DEVICE
Filed Sept. 15, 1928
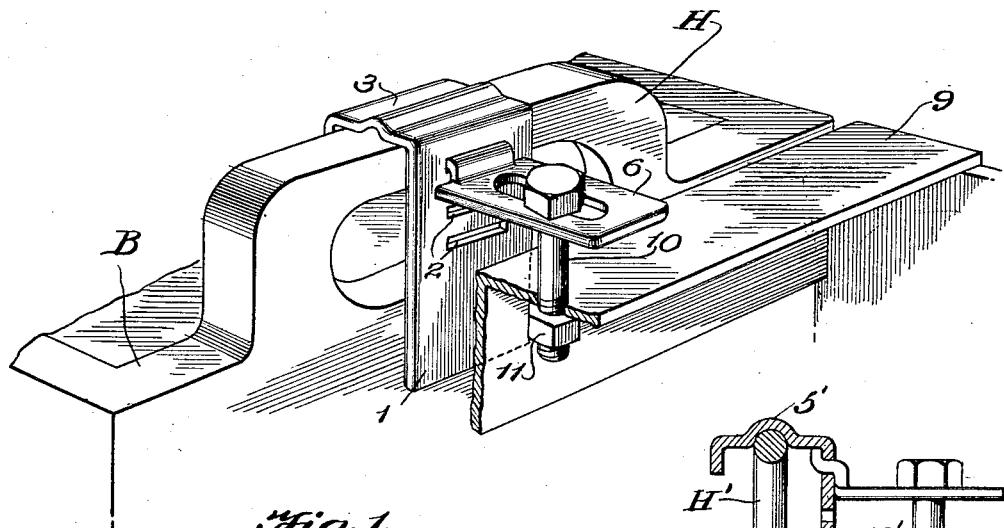
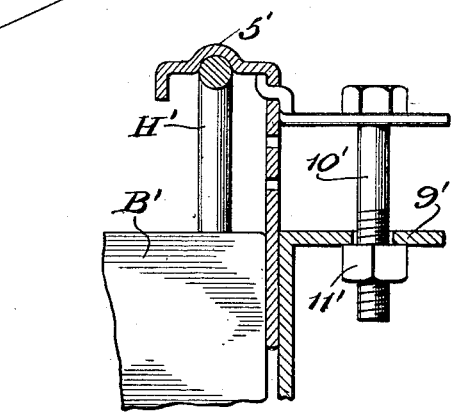
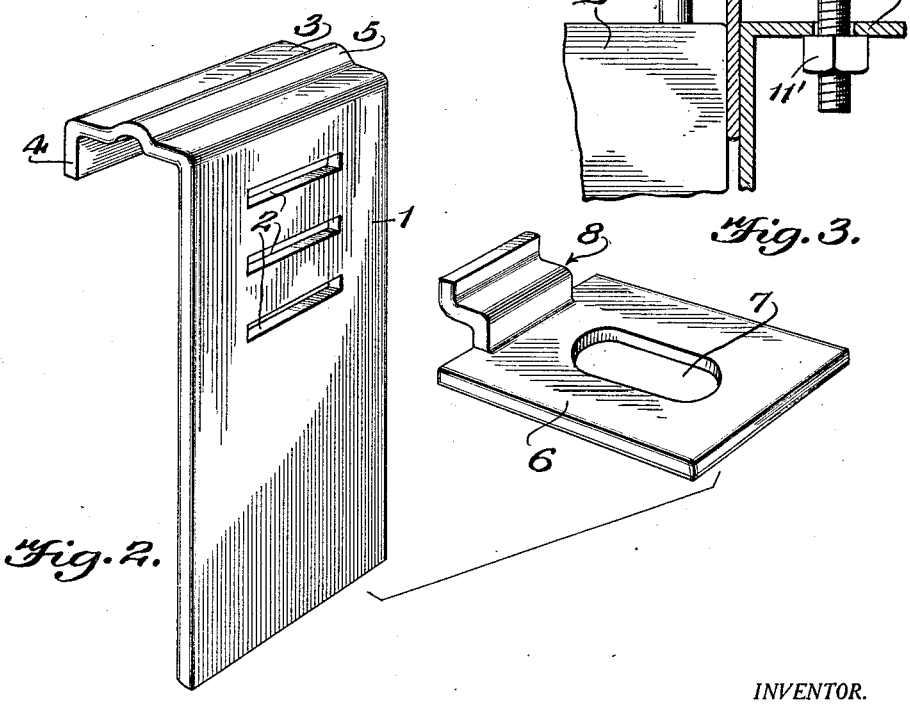
INVENTOR.
John Taylor.
BY
Linton, Kellogg & Smith
ATTORNEYS.

Patented Aug. 12, 1930

1,772,847

UNITED STATES PATENT OFFICE

JOHN TAYLOR, OF CHICAGO, ILLINOIS

BATTERY-SECURING DEVICE

Application filed September 15, 1928. Serial No. 306,261.

This invention relates to improvements in storage battery securing devices, having for an object to provide a novel form of storage battery hold-down clamp particularly advantageous in the use of the positive and firm securing of storage batteries in the usual supporting frames provided therefor in the chassis or body of motor driven vehicles, whereby to eliminate vibration of the battery, together with those disadvantages incident to such movement and further, to prevent any and all relative shifting of the equipped battery in its receiving and supporting frame so identified, the arrangement and construction of the hold down being such as will allow of ready and convenient installation of the same without modification or adjustment of the now prevalent types of storage battery boxes or casings or the frames serving to support them upon or within a vehicle.

It is also amongst the salient objects of this invention to provide a battery hold-down clamp capable of effectually securing storage batteries equipped with either wood, hard rubber or composition boxes or casings against movement in their particular supporting frames, avoiding the need for individually designed clamps and therefore, affording an accessory of great commercial merit by reason of its universal mode of adaption.

Another object of the invention may be stated to reside in the provision of a device of the character mentioned whereby vertical or longitudinal adjustment is permitted between the hold-down proper and the securing bracket arm thereof, thus, facilitating its installation with but a minimum of adjustment following an inter-engagement of said elements and their connection with the battery box and supporting frame.

Other objects of the invention will be in part obvious and in part pointed out hereinafter.

In order that the invention and its mode of operation may be readily understood by those skilled in the art to which it appertains, I have in the accompanying illustrative drawings and in the detailed following description based thereupon, set out one possible embodiment of the invention.

In these drawings:

Figure 1 is a perspective view of the improved hold-down clamp showing it adapted to a storage battery equipped with a hard rubber or composition box or casing together with the arrangement of the hold down as respects the battery receiving frame usually provided in motor driven vehicles, Figure 2 is a disassembled perspective view of the improved clamp, and Figure 3 is a fragmentary detail in vertical section through the invention showing it adapted to that type of storage battery provided with a wooden box or casing and the usual metal handles.

Having more particular reference to the drawings, in connection with which like characters of reference will designate corresponding parts throughout, the improved hold down clamp may be stated to comprise a strip of substantially rigid yet slightly spring metal, such as steel or the like, bent into a substantially right angular formation, having a comparatively elongated normally vertically disposed shank portion or panel 1 in which a series of relatively spaced transversely disposed slots generally indicated by the numeral 2 are formed; the normally upper extremity of the clamp is formed with a right angular extension or lip 3 having a downwardly disposed flange 4 formed upon the free extremity thereof as is clearly shown in the Figures 2 and 3. The lip portion 3, just described, is preferably provided with a longitudinally disposed intermediately arranged channel or depression 5, curved in cross section and adapted to be employed as a means for positively receiving and engaging over the usual round metal handle of storage batteries equipped with wooden boxes or casings, hereinafter more fully referred to. Also, it is to be noted that the width of the right angularly disposed lip 3 is such as to permit the same to generally correspond to the width or thickness of the handle usually formed integral with or fixed upon opposite sides of the boxes of storage batteries constructed of hard rubber or similar composition material, thereby permitting of a snug engagement of the hold down proper between the downwardly disposed flange 4 and the adjacent portion of the inner side wall of the normally vertically disposed shank or panel portion 1.

That means may be provided for effecting a positive or binding connection of the hold-down proper with an equipped storage battery box or casing and to the usual receiving or supporting frame provided therefor in those types of motor driven vehicles prevalent in the art at this time, I provide the device with a bracket arm indicated by the numeral 6, said arm being preferably formed of steel or similar material possessing the combined properties of tensile strength and spring qualities forming longitudinally of the intermediate portion thereof a slot 7, while upon the normally inner end of this second arm, I integrally form an engaging or connecting lip designated in its entirety by the numeral 8, said tongue being of a length slightly less than the width of the arm and being of reversely curved cross sectional formation, as is well shown in the Figures 2 and 3; the length of this engaging tongue approximately coinciding with the lengths of the various relatively spaced slots 2 formed in the shank or panel portion 1 of the battery hold down proper, so that a snug engagement of the said tongue may be selectively effected with any one of the particular slots 2.

In usage of the improved battery hold down clamp, the battery is placed in the usual receiving or supporting frame provided therefor, a portion of which is shown in the Figures 1 and 3 of the accompanying drawings and designated by the numeral 9. Where the battery to be secured or held against vibratory or relative shifting movement is equipped with a hard rubber or composition casing, the right angularly disposed lip 3 is engaged over the upper portion of the integral handle H of the battery casing B, the shank or panel portion 1 being arranged in a vertical plane adjacent to the particular side of said battery box to be now secured. The bracket arm 6 of the hold-down proper is now engaged in one of the relatively spaced slots 2 formed in the shank or panel 1 of the hold down proper and is extended therefrom at substantially right angles, it being noted in this connection that by reason of the reversed cross sectional curvature of the tongue 8, a shouldered engagement of the arm will be effected with an adjacent portion of the panel 1 and consequently thereupon, that this angular positioning of the bracket arm 6 with respect to said panel will be effected. At this time, a connecting bolt 10 is passed through the slot 7 of the bracket arm 6 and through an adjacent opening formed in the corresponding side of the battery box retaining frame 9 following which a locking nut is turned into engagement with the screw threaded end of the bolt and is then tightened to an extent such as will be efficient to effect a positive and binding connection of the hold down in its entirety with the battery handle H engaged thereby. The opposite side of handle of the battery B is now supplied with a second battery hold down clamp similar to the one just described and the connection of this particular clamp to the adjacent side of the battery box receiving frame is repeated so that with completion of the operation, hold down clamps will be positively and firmly engaged with the opposite handles H of the battery box or casing B and because of this, said battery will be firmly held in its receiving and supporting frame 9 against vibratory movement and in fact, against any possibility of relative shifting movement within said receiving and supporting frame. The battery, when desired, may be quickly and conveniently removed from the frame 9 by disengaging the locking nuts 11 of the bolts 10, then effecting a swinging like movement of the bracket arms 6 so as to disengage them from the particularly engaged slots 2 of their respective hold-downs proper or if not this, then with disengagement of the locking nuts 11 from the bolts 10, the battery may be readily lifted from the frame 9, carrying with it the hold-down clamps and the connecting or securing bolts 10.

Where a storage battery provided with a wooden box or casing and with the usual metal handles H' is to be secured in a receiving and supporting frame 9, it will be understood that the handles H' are engaged or received in the longitudinal disposed ways or channels 5 formed in the slips 3 of the several hold-downs employed in the fashion as illustrated in the Figure 3, following which the bracket arms 6 are selectively engaged with one of the series of relatively spaced slots 2 in the shank portions of the hold-downs, after which connecting bolts 10' are passed through the slots 7 of the bracket arms and through openings formed in the adjacent sides of the receiving and supporting frame 9' and then have locking nuts 11' turned into engagement therewith whereby to effect a downwardly directed pull or clamping action upon the handles 8 of the battery B' and thereby to effect a positive hold-down or clamping of the same against vibratory movement or other relative shifting movement in its particular supporting frame 9'.

Herein, it will be understood that because of the formation of the longitudinal channels 5 in the lip portions 3 of the hold-downs proper, said hold-downs will be allowed to have a positive engagement and connection with the handles H' of those types of storage batteries employing wooden boxes or casings and that because of this provision of channels or ways, the improved hold-down clamp is rendered universal in its adaption, that is, it may be effectually used in connection with hard rubber, composition or wooden storage battery boxes or casings with equal success.

Due to the provision of the relatively spaced slots 2 in the shank portion 1 of the hold-downs proper, it is to be understood that a person installing the improved device will be enabled to bring about a much quicker connection of the same both to the battery and to the adjacent side of the receiving and supporting frame provided therefor in a motor driven vehicle, after which a connecting bolt may be inserted in the manner hereinbefore described and the locking nut thereof engaged with the same and brought into binding action with but a minimum amount of effort for turning of said nut onto the screw threaded portion of its bolt.

Manifestly, the consstruction shown is capable of considerable modification and such modifications as are within the scope of my claim, I consider within the spirit of my invention.

I claim:

A battery hold-down comprising a body portion formed upon its normally upper end with a right angularly disposed flanged lip, said body portion having a plurality of longitudinally alined relatively spaced transversely disposed slots formed therein and the length of such body being such as to permit the same to extend for a distance longitudinally along one side of a battery with the right angularly disposed flanged lip adapted for engagement with an upper side of a battery handle, a clamping arm having a reversely curved tongue fixedly arranged upon one end of the same transversely thereof and intermediately of the opposite sides of said arm, the length of said tongue being such as to be snugly received in said slots in the body portion and to permit of supporting of said clamping arm at positions substantially right angularly to said body portion when so engaged, said clamping arm being formed with a longitudinally disposed slot and the clamping arm being adapted to be arranged in spaced relation above a portion of the battery holding frame, and a bolt passing through the longitudinal slot in said clamping arm and adapted for engagement with said side of the battery holding frame for effecting adjustable clamping connection therebetween.

In witness whereof I have hereunto set my hand.

JOHN TAYLOR.